United States Patent
Perron

(10) Patent No.: US 9,749,043 B2
(45) Date of Patent: Aug. 29, 2017

(54) METHOD FOR REFERENCING AN OPTICAL POWER LOSS MEASUREMENT SYSTEM, AND ASSOCIATED COMPUTER READABLE MEMORY AND OPLM SYSTEM

(71) Applicant: EXFO INC., Quebec (CA)

(72) Inventor: Stephane Perron, Levis (CA)

(73) Assignee: EXFO INC., Québec (CA)

( * ) Notice: Subject to any disclaimer, the term of this patent is extended or adjusted under 35 U.S.C. 154(b) by 0 days.

(21) Appl. No.: 14/941,759

(22) Filed: Nov. 16, 2015

(65) Prior Publication Data

US 2016/0164601 A1    Jun. 9, 2016

Related U.S. Application Data

(60) Provisional application No. 62/089,581, filed on Dec. 9, 2014.

(51) Int. Cl.
   *H04B 10/079*  (2013.01)
   *G01M 11/00*  (2006.01)

(52) U.S. Cl.
   CPC ....... *H04B 10/07955* (2013.01); *G01M 11/33* (2013.01)

(58) Field of Classification Search
   CPC ............ H04B 10/07953; H04B 10/07955
   See application file for complete search history.

(56) References Cited

U.S. PATENT DOCUMENTS

| | | | |
|---|---|---|---|
| 5,455,672 A | 10/1995 | Lamonde et al. | |
| 6,959,126 B1 * | 10/2005 | Lofland | G01M 11/335 385/16 |
| 7,756,418 B2 * | 7/2010 | Ofalt | H04B 10/077 356/73.1 |
| 2006/0093295 A1 * | 5/2006 | Ohtani | G02B 6/255 385/123 |
| 2008/0044180 A1 * | 2/2008 | Leonov | H04B 10/0791 398/25 |

(Continued)

OTHER PUBLICATIONS

Derickson, Dennis, "Fiber Optic Test and Measurement", 1998, New Jersey, pp. 340-341.

(Continued)

*Primary Examiner* — Dzung Tran
(74) *Attorney, Agent, or Firm* — Norton Rose Fulbright Canada LLP; Alexandre Daoust

(57) ABSTRACT

The computer readable memory has recorded thereon instruction code for execution by a computing device for use with an optical power loss measurement (OPLM) system. The instruction code generally comprises: code for displaying a first set of instructions including measuring a first power value of test light outputted from a first reference optical waveguide; code for displaying a second set of instructions including measuring a second power value of test light outputted from a reference waveguide link including the first reference optical waveguide connected in series to a second reference optical waveguide; code for displaying a third set of instructions including measuring a reference power value of the OPLM system resulting from the propagation of light from via the reference waveguide link; and code for determining a corrected reference power value based on the reference power value and on the first and second power values.

24 Claims, 10 Drawing Sheets

(56) References Cited

U.S. PATENT DOCUMENTS

2016/0091392 A1* 3/2016 Fusco .................... G01M 11/30
356/73.1

OTHER PUBLICATIONS

Telecommunications Industry Association, "Optical Power Loss Measurements of Installed Multimode Fiber Cable Plant; IEC 61280-4-1 Edition 2, Fibre-Optic Communications Subsystem Test Procedure—Part 4-1 : Installed cable plant—Multimode attenuation measurement", Oct. 2010, Virginia, all pages.
The FOA Reference for Fiber Optics, "Understanding the Math of Insertion Loss Testing", The Fiber Optic Association, Inc.—Reference Guide to Fiber Optics, pp. 1-11, 1999-2010, Retrieved from the Internet on Jan. 28, 2014.

\* cited by examiner

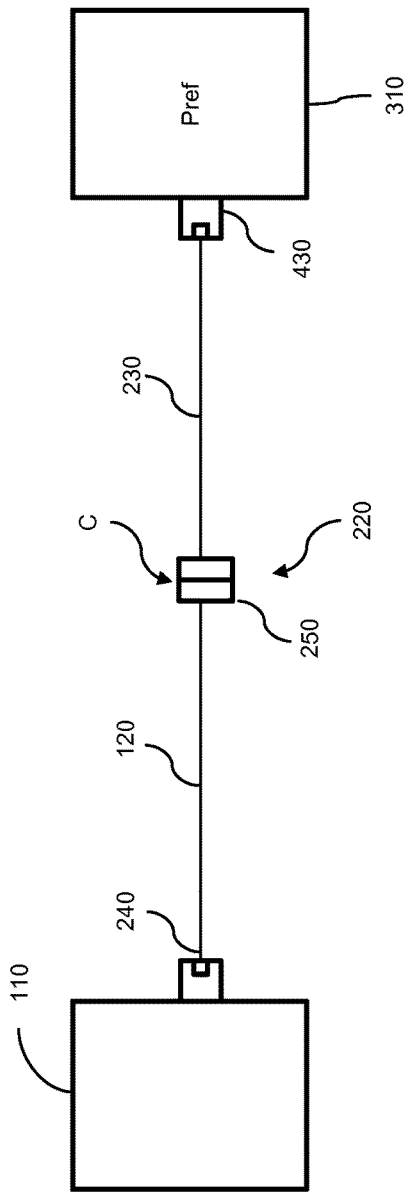
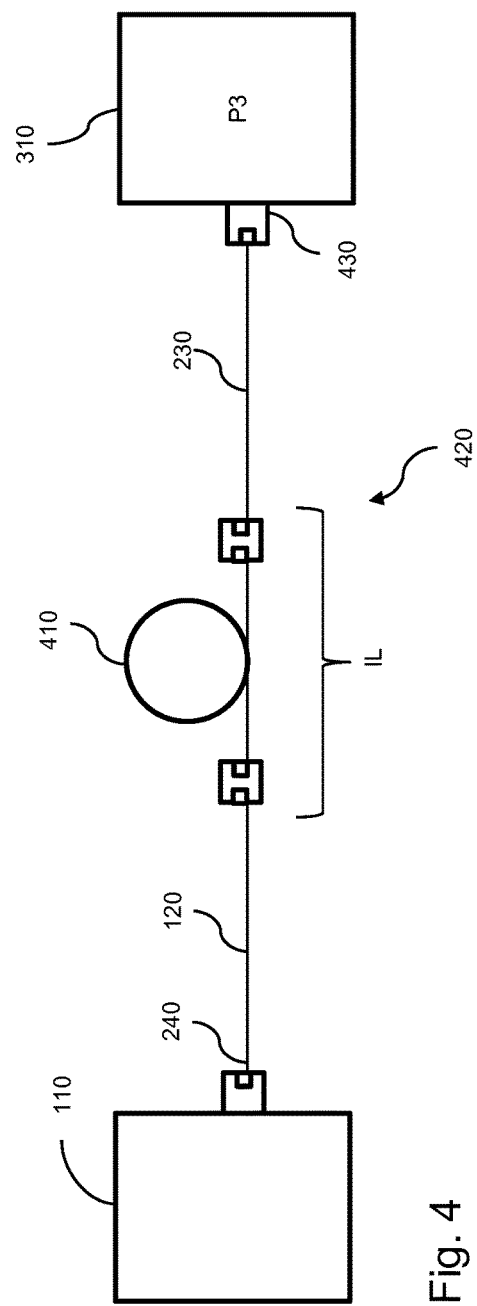
Fig. 3
Fig. 4

METHOD FOR REFERENCING AN OPTICAL POWER LOSS MEASUREMENT SYSTEM, AND ASSOCIATED COMPUTER READABLE MEMORY AND OPLM SYSTEM

REFERENCE TO RELATED APPLICATIONS

This patent application claims priority of U.S. provisional Application Ser. No. 62/089,581, filed on Dec. 9, 2014, the content of which is hereby incorporated by reference.

FIELD

The improvements generally relate to the field of measuring an insertion loss value of a device under test (DUT), and more particularly relate to the field of measuring an insertion loss value using two optical power loss measurement (OPLM) devices such as optical loss test sets (OLTSs).

BACKGROUND

Optical power loss measurements are crucial for proper management of network communication systems. To this end, the Telecommunications Industry Association (TIA) and the American National Standards Institute (ANSI) established standard procedures for measuring power loss values using a light source and a power meter (referred to as the Light Source Power Meter (LSPM) approach). The ANSI/TIA-526-14-B-2010 Standard proposes different methods for referencing an optical power loss measurement (OPLM) system based on the LSPM approach. These referencing and measuring procedures were thus meant to standardize optical power loss measurements associated with a multitude of scenarios that are expected to occur in this field.

The one-cord reference procedure described therein (see Annex A) for instance provides insertion loss measurements having minimized uncertainty and includes insertion losses associated with both end connectors of the DUT. However, the one-cord reference procedure requires that the power meter employs a large-area detector. Conversely, the three-cord reference procedure described therein excludes losses associated with both of the end connectors whereas the two-cord reference procedure includes the loss of one of the end connectors. Both the three-cord and the two-cord reference procedures may be employed with fiber-pigtailed detectors but they are known to introduce a small bias in the insertion loss measurement (see ANSI/TIA-526-14-B-2010 B.5 and C.5).

Multifunction OLTSs, such as the FOT-930 test instruments manufactured by EXFO Inc., are handheld devices that provide insertion loss measurements based on the LSPM approach, which conveniently incorporate measurement of additional parameters such as bi-directional Optical Return Loss (ORL) measurements and fiber-length measurements. However, because the OLTS power detectors are fiber pigtailed, the one-cord reference procedure is not applicable and the two-cord and/or the three-cord reference procedures may suffer from the aforementioned small bias.

Although existing OPLM techniques are satisfactory to a certain degree, it would be desirable to overcome their limitations with an improved measurement technique.

SUMMARY

There is provided herein a method for referencing an OPLM system and a method for determining an insertion loss value of a DUT using the referenced OPLM system.

More specifically, there is provided a method which allows for measuring, using the OPLM system (e.g., two OLTS units and associated patch cords), the insertion loss value of the DUT with a degree of accuracy similar to what can be provided using the one-test cord procedure while maintaining the convenience associated with the two-cord and the three-cord reference procedures, notably allowing other types of measurement to be performed on the DUT.

In accordance with one aspect, there is provided a method for referencing an OPLM system including an optical source and a detector, the method comprising the steps of: measuring a first power value of all test light outputted from a first reference optical waveguide; measuring a second power value of all said test light outputted from a reference waveguide link including the first reference optical waveguide connected in series to a second reference optical waveguide; measuring, using the detector of the OPLM system, a reference power value of the OPLM system resulting from the propagation of light from the optical source to the detector via the reference waveguide link; and determining a corrected reference power value based on the reference power value and on the first and second power values.

In accordance with another aspect, there is provided a non-transitory computer readable memory having recorded thereon instruction code for execution by a computing device for use with an OPLM system including an optical source and a detector, said instruction code comprising: code for displaying to a user a first set of instructions, the first set of instructions including measuring a first power value of all test light outputted from a first reference optical waveguide; code for displaying to the user a second set of instructions, the second set of instructions including measuring a second power value of all said test light outputted from a reference waveguide link including the first reference optical waveguide connected in series to a second reference optical waveguide; code for displaying to the user a third set of instructions, the third set of instructions including measuring, using the detector of the OPLM system, a reference power value of the OPLM system resulting from the propagation of light from the optical source to the detector via the reference waveguide link; and code for determining a corrected reference power value based on the reference power value and on the first and second power values.

In accordance with another aspect, there is provided an OPLM system comprising: a first OPLM device including: a first housing having a first connector interface; a first optical source mounted in the first housing and optically coupled to the first connector interface; and a first large-area detector mounted to the first housing; a second OPLM device including: a second housing having a second connector interface; a first detector mounted in the second housing and optically coupled to the second connector interface; and a second large-area detector mounted to the second housing; and at least one computing device mounted in at least one of the first and second housings and in communication with the first optical source, the first and second large-area detectors and the first detector, the at least one computing device being configured to perform the steps of: receiving a first power value associated with measuring, using at least one of the first large-area detector and the second large-area detector, a test light outputted from a first reference optical waveguide; receiving a second power value associated with measuring, using at least one of the first large-area detector and the second large-area detector, the test light outputted from a reference waveguide link including the first reference optical waveguide connected in series to a second reference optical waveguide; receiving a reference power value of the OPLM system, the reference power value being measured using the first detector of the second OPLM device and resulting from the propagation of light from the first optical source of the first OPLM device to the first detector of the second OPLM device via the reference waveguide link; and determining a corrected reference power value based on the reference power value and the first and second power values.

In accordance with another aspect, there is provided a method for measuring an optical insertion loss of an optical DUT using an OPLM system comprising an optical source and a detector, the method comprising the steps of: obtaining a reference connection value from a difference between a second power value and a first power value, the first power value corresponding to a measurement of a test light at an open end of at least one first reference optical waveguide and the second power value corresponding to a measurement of the test light at an open end of a reference waveguide link including the first reference optical waveguide connected in series to a second reference optical waveguide; obtaining a reference power value of the OPLM system, the reference power value resulting from the propagation of light from the optical source to the detector via the reference waveguide link; determining a corrected reference power value based on the reference power value and on the first and second power values; obtaining, from the detector of the OPLM system, a third power value resulting from the propagation of light from the optical source to the detector via a test link including the DUT connected in series between the first and second reference optical waveguides; and determining the insertion loss of the DUT link based on the corrected reference power value and on the third power value.

Many further features and combinations thereof concerning the present improvements will appear to those skilled in the art following a reading of the present disclosure.

DESCRIPTION OF THE FIGURES

In the figures,

FIG. 3 is a schematic view of an example of an OPLM system, in accordance with a third step of the first method for referencing the OPLM system;

FIG. 4 is a schematic view of an example of an OPLM system, in accordance with a step of a first method for determining an insertion loss value of a DUT;

DETAILED DESCRIPTION

Figure 1:
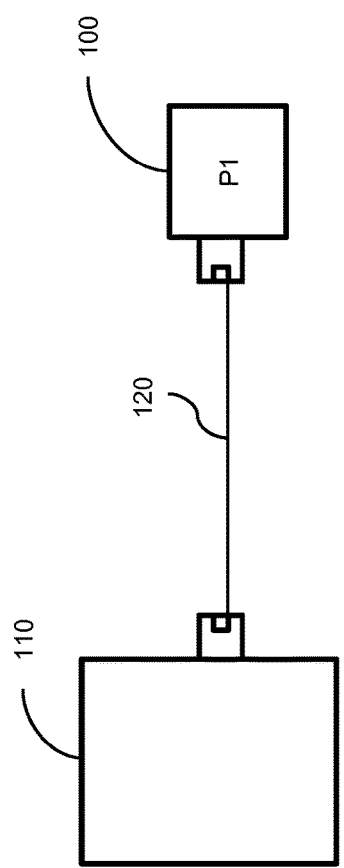
FIG. 1 is a schematic view of an example of an OPLM system, in accordance with a first step of a first method for referencing the OPLM system.

The methods and systems described herein can be used for characterizing optical fiber links or other optical devices, for referencing an OPLM system and for determining an insertion loss value of a DUT using the referenced OPLM system.

The OPLM system can be provided in the form of two OPLM devices optically coupled to one another via a test link including the DUT. These OPLM devices can be provided in the form of OLTSs or in the form of two multifunction loss testers, for instance. The components and configuration of the OPLM device and system will be described below, however, it should be understood that the OPLM devices of the OPLM system can be configured to measure global values of the DUT including bi-directional losses, bi-directional optical return losses (ORL) and the length of the DUT. These bi-directional measurements are allowed if each of the OPLM devices has a pigtailed optical source and a pigtailed detector. These pigtailed components are optically coupled to a connector interface of the OPLM device so that the pigtailed optical source can transmit light towards the connector interface and that light incoming from the connector interface can be detected using the pigtailed detector.

Also, in an embodiment, the DUT is an optical fiber link, whereas in another embodiment, the DUT can include an optical waveguide link such as a planar waveguide and/or optical components.

It has been found that, in the context of such OPLM systems, the standard one-cord reference procedure established by the Telecommunications Industry Association (TIA) may not be applicable when power measurements at each of the OPLM devices (such as the OLTSs) are performed via pigtailed detectors, instead of large-area detectors.

Moreover, it is known that the one-cord reference procedure is more accurate than the two-cord or the three-cord reference procedures since the latter two tend to add a bias in the insertion loss value measurements. Indeed, the two-cord reference procedure includes a prior step of measuring a reference power value of the optical measurement system by propagating light from the optical source to the detector via a link including a first reference optical waveguide connected to a second reference optical waveguide via a connector. The DUT is then inserted between the first and second reference optical waveguides to measure a test link power value. Then, the insertion loss value can be obtained by subtracting the reference power value from the test link power value. With this procedure, it is known that the measured insertion loss value includes the loss corresponding to one end connector but may also comprise a non-zero bias value associated with a difference between the loss of the connector of the reference waveguide link and the loss of each of the end connectors of the DUT (see ANSI/TIA-526-14-B-2010 C.5).

Scenarios where the DUT is relatively long (e.g. >20 km) and where the acceptable loss is moderate (4-6 dB) were the main test-and-measurement scenarios considered several years ago when these standard procedures were conceived. The insertion loss associated with the end connectors and the bias associated with the two- and the three-cord reference procedures were considered negligible in comparison with the insertion loss value associated with the DUT. For this reason, the standard procedures at the time of filing the present specification typically neglected to take into account the connector loss value associated with the connector of the reference waveguide link.

Nowadays, loss measurements are increasingly being carried out on relatively short optical fiber links (e.g. <2 km), such as those often found in "enterprise", data-center, and Fiber-To-The-X (FTTX) applications (the generic X may represent N for node, B for business, H for home, or A for antenna, etc.). In these contexts, low-loss DUTs (e.g. 0.4-0.6 dB) often need to be characterized, and hence losses stemming from the test cord connection often dominate that of the DUT itself. Consequently, in order to avoid unacceptable levels of measurement uncertainty, these connection-related losses must be properly taken into account. If such test cord connection losses are not properly taken into consideration, the measured values can be totally unreliable, even giving rise to an apparent negative loss value, for instance.

The method and system described herein allow for correcting a reference power value of the OPLM system using an accurate measurement of the connector loss value. By doing so, the provided methods enable measurement of the insertion loss value of the DUT with a level of uncertainty similar to that which can be provided using the one-test cord procedure while also allowing measurements to be made with a pigtailed detector and therefore allowing other types of measurements (bi-directional loss, ORL, etc.) to be performed on the DUT.

FIG. 1 is a schematic view of a first step of a first method for referencing the OPLM system, in accordance with an embodiment. As depicted, the first step includes measuring, using a first large-area detector 100, a first power value P1 of a test light emitted by an optical source 110 and outputted from a first reference optical waveguide 120. In an embodiment, the first large-area detector 100 is a power meter configured to detect a power value of light in an infrared region of the electromagnetic spectrum. More specifically, the first large-area detector 100 is configured to detect a power value of light having a wavelength of 1310 nm, 1490 nm and/or 1550 nm, for instance.

Figure 2:
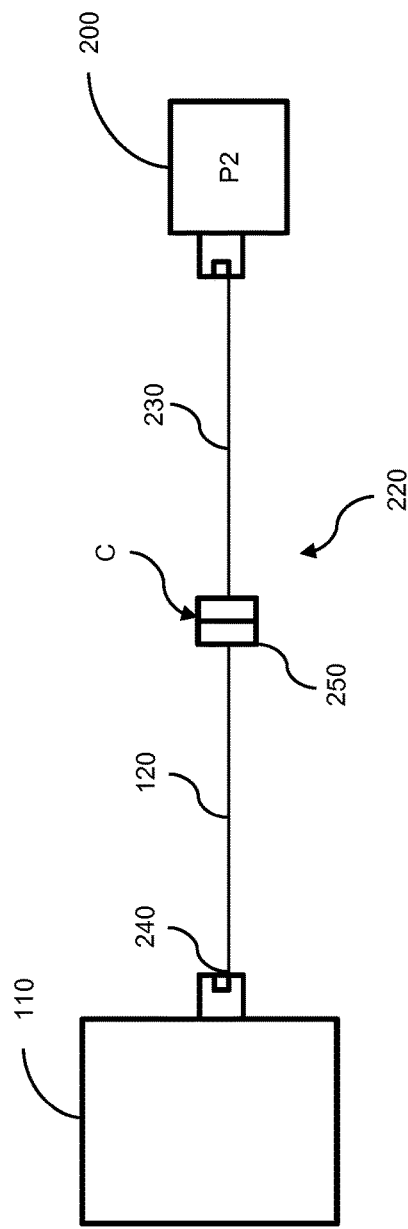
FIG. 2 is a schematic view of an example of an OPLM system, in accordance with a second step of the first method for referencing the OPLM system.

FIG. 2 is a schematic view of a second step of the first method for referencing the OPLM system, in accordance with an embodiment. As shown, the second step includes measuring, using a second large-area detector 200, a second power value P2 of a test light emitted from the optical source 110 and outputted from a reference waveguide link 220 including the first reference optical waveguide 120 connected in series to a second reference optical waveguide 230. The first and second optical waveguides 120 and 230 are connected to one another by a connector 250 which has a connector loss value C (can be referred to as "reference loss value C"). Because the connector loss value C is measured using large-area detection, the connector loss value can be accurately determined. Accordingly, the connector loss value C can be evaluated in decibels by performing:

$$C \text{ [dB]} = P1 \text{ [dBm]} - P2 \text{ [dBm]}. \quad (1)$$

Throughout this document, power values and power ratios are expressed in dBm and dB, respectively. However, one skilled in the art will understand that the connector loss value C can equivalently be expressed on a linear scale.

In practice, the first large-area detector 100 and the second large-area detector 200 respectively employed to measure P1 and P2 will typically be a single large-area detector, thereby minimizing the uncertainties due to calibration of the first large-area detector 100 and the second large-area detector 200. In other words, the first and second power values P1 and P2 are measured using the same large-area detector thus avoiding the uncertainties associated with using two different large-area detectors. However, in another embodiment, it is noted that the first and second large-area detectors 100 and 200 are distinct but calibrated in order to provide comparable power values. In order to obtain reliable measurements, it is strongly recommended to not disconnect an end 240 of the first reference optical waveguide 120 to the optical source 110 between the first and second steps of the first method for referencing the OPLM system.

It should be noted that although the embodiments described herein employ large-area detection, in practice, the large-area detectors may be replaced by any detection means that capture substantially all test light outputted from the test cords. An example of such detection can involve a small detector equipped with a converging lens that is brought in close proximity with the open end of the test cord.

FIG. 3 is a schematic view of a third step of the first method for referencing the OPLM system, in accordance with an embodiment. As illustrated, the second reference optical waveguide 230 of the reference waveguide link 220 is connected to a pigtailed (i.e. fibered) detector 310. The third step thus includes measuring, using the pigtailed detector 310, a reference power value Pref of light outputted from the second reference optical waveguide 230 of the reference waveguide link 220. In an embodiment, which will be further described hereinbelow, the optical source 110 used for measuring the reference power value Pref can be different from the optical source used for measuring the first and second power values P1 and P2. More specifically, in this embodiment, the measurement of the reference power value Pref is performed using an optical source different from the optical source 110 by propagating light into the reference waveguide link 220 from the second reference optical waveguide 230 to the first reference optical waveguide 120, for instance. Now, as mentioned above, the reference power value Pref is biased by an offset value corresponding to the connector loss value C. However, the reference power value Pref can be corrected using the previously measuring connector loss value C in order to avoid this bias. Accordingly, the first method for referencing the OPLM system includes a step of determining a corrected reference power value Pref,c by performing:

$$Pref,c = Pref + C. \quad (2)$$

It is readily understood that the corrected reference power value Pref,c is obtained using the reference power value Pref and the connector loss value C, but it can also be obtained using the reference power value Pref and the first and second power values P1 and P2 such that:

$$Pref,c = Pref + (P1 - P2). \quad (3)$$

Also, it is noted that connector loss value C and the corrected reference power value Pref,c can be obtained by addition/subtraction when the values are measured in dBm, for instance. Of course, if alternatively these values are expressed in linear units (in mW, for instance), equations equivalent to Equations (2) and (3), involving multiplications and/or divisions, may be readily formulated. At this stage of the first method for referencing the OPLM system, it is understood that although the reference power value Pref is measured using the pigtailed detector 310, the corrected reference power value Pref,c is adjusted using the accurate measurement of the connector loss value C during the first and second steps of the first method for referencing the OPLM system illustrated in FIGS. 1 and 2.

FIG. 4 is a schematic view of a step of a first method for determining an insertion loss value IL of the optical DUT 410 using the previously obtained corrected reference power value Pref,c, in accordance with an embodiment. As shown, the optical source 110, which is the same optical source 110 that measured the reference power value Pref in the third step of the first method for referencing the OPLM system, is connected to the pigtailed detector 310 via a test link 420 including the first reference optical waveguide 120 connected in series with the DUT 410, which is, in turn, connected in series with the second reference optical waveguide 230. This step includes measuring, using the pigtailed detector 310, a third power value P3 by propagating light from the optical source 110 to the detector 310 via the test link 420. The first method for determining the insertion loss value IL of the DUT 410 further includes a step of determining the insertion loss value IL of the DUT 410 based on the corrected reference power value Pref,c and on the third power value P3 by performing:

$$IL = P3 - Pref,c = P3 - (Pref + C) = P3 - (Pref + (P1 - P2)). \quad (4)$$

In other words, the insertion loss value IL can be obtained by subtracting the corrected power loss value Pref,c from the third power value P3. As above, equivalent equations formulated for linear values involve multiplications and/or divisions. It is noted that the first reference waveguide 120 should not be disconnected from the optical source 110 and that the second reference waveguide 230 should not be disconnected from the detector 310' between the third step of the first method for referencing the OPLM system and the step of the first method for determining the insertion loss value IL. However, the first reference waveguide 120 can be disconnected from the optical source 110 and/or the optical source 110 can be changed between the second and the third steps of the first method for referencing the OPLM system.

It is understood that in accordance with an embodiment, at least one of the first and second reference optical waveguides 120 and 230 is provided in the form of a single waveguide. In this embodiment, the single waveguide can be an optical fiber, and more specifically, a single-mode optical fiber. Still in accordance with this embodiment, each of the reference optical waveguides 120 and 230 is provided in the form of a terminated test cord for providing a suitable connection interface with the DUT 410, the optical source 110 and/or the pigtailed detector 310. In accordance with another embodiment, any of the first reference optical waveguide 120 and the second reference optical waveguide 230 is provided in the form of a planar waveguide, such as a strip waveguide typically used in silicon photonics. In accordance with still another embodiment, the first and second reference optical waveguides 120 and 230 are each provided in the form of a combination of a plurality of suitable waveguides connected in series. In circumstances where the first reference optical waveguide 120 comprises two auxiliary waveguides connected in series, the auxiliary waveguide that is connected to the optical source 110 is conveniently termed the launch waveguide, and the other auxiliary waveguide is termed the adapter waveguide. In some embodiments, this latter waveguide is used as a transition between the launch waveguide and the DUT 410 when the connectors of the launch waveguide and the DUT 410 are incompatible, for instance.

The first method for determining the insertion loss value IL of the DUT 410 can be extended to encompass more than one test wavelength. Indeed, the insertion loss value IL can vary depending on whether the DUT 410 is interrogated at one or at another wavelength, it is therefore useful to measure the power values P1, P2, P3 and the reference power value Pref at a plurality of different wavelengths such that each one of the variables P1, P2, P3, Pref can be expressed as a vector (i.e. one-dimensional array). Accordingly, each one of the corrected reference power value Pref,c and the insertion loss value IL will also be a vector.

FIGS. 5-8 are schematic views of an example of an OPLM system 500 comprising a first OPLM device 510 and a second OPLM device 510', wherein non-primed reference numerals are associated with the first OPLM device 510 while primed reference numerals are associated with the second OPLM device 510'. These figures are used as visual support for describing a second method for referencing the OPLM system and a second method for determining the insertion loss value IL of the DUT 410. As depicted, the first and second OPLM devices 510, 510' have housings 520, 520' inside which are operatively mounted optical sources 110, 110', pigtailed detectors 310, 310' (and/or fibered detector), power source monitors 590, 590' and at least one large-area detector such as large-area detectors 530, 530'. Although only the large-area detector 530 is used in the second methods described in connection with FIGS. 5-8, it is understood that the large-area detector 530' can be used as well. The OPLM devices 510, 510' have connector interfaces 540, 540' for receiving light from the optical sources 110, 110' and transmitting light towards the pigtailed detectors 310, 310', respectively. More specifically, the OPLM devices 510, 510' have respective optical couplers 550, 550' optically coupled to the respective optical sources 110, 110', to the respective power source monitors 590, 590', to the respective pigtailed detectors 310, 310' and to the respective connector interfaces 540, 540'. Also, each of the power source monitors 590, 590' is adapted to measure a power of a corresponding one of the optical sources 110, 110' via a corresponding one of the optical couplers 550, 550'.

Figure 5:
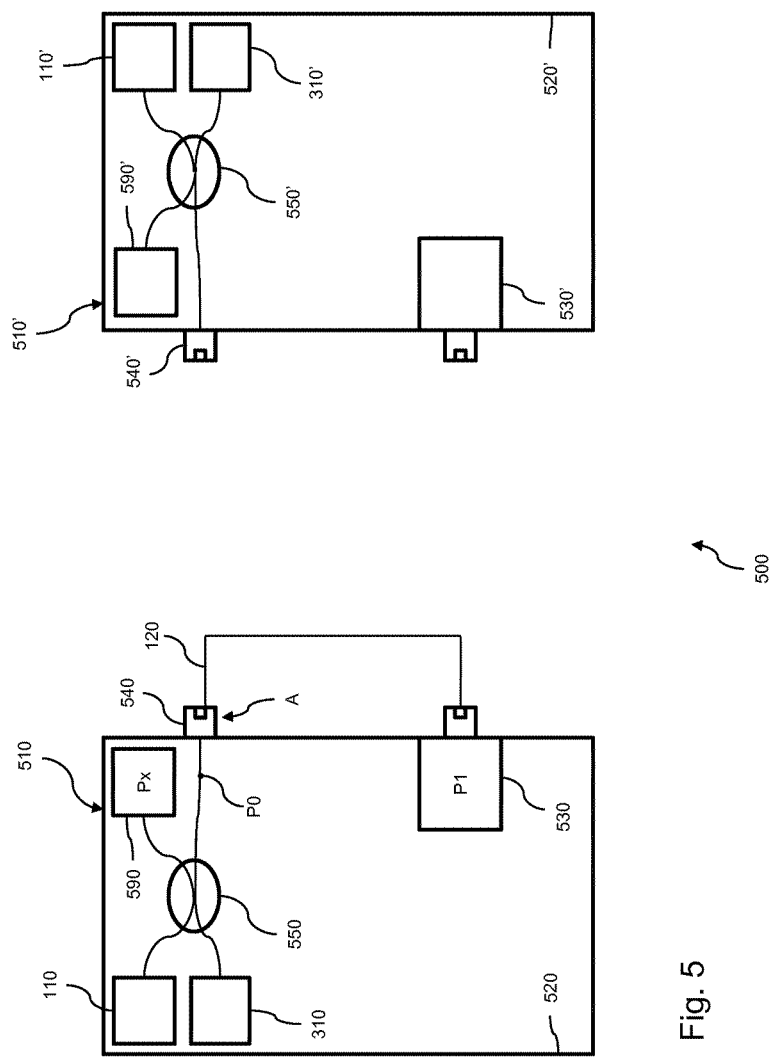
FIG. 5 is a schematic view of an example of an OPLM system, in accordance with a first step of a second method for referencing the OPLM system.

FIG. 5 shows a first step of a second method for referencing the OPLM system. This first step comprises measurement of a first power value P1 of power transmitted into the first reference optical waveguide 120 via the first end 240 thereof. It can be seen that, in this embodiment, the first power value P1 is measured using the large-area detector 530 mounted to the housing 520 of the first OPLM device 510, which can be convenient for the end user. Optionally, at this first step, insertion loss A associated with the connector interface 540 can be estimated from the power value Px measured at the power source monitor 590. More specifically, from a factory calibration of the optical coupler 550 and the measured power value Px, the power level P0 upstream of the connector interface 540 can be retrieved. The insertion loss A can then be estimated from a difference between the first power value P1 and the power level P0. The estimated insertion loss A may be compared to a predetermined threshold for verification of the quality of the connection at the connector interface 540.

Figure 6:
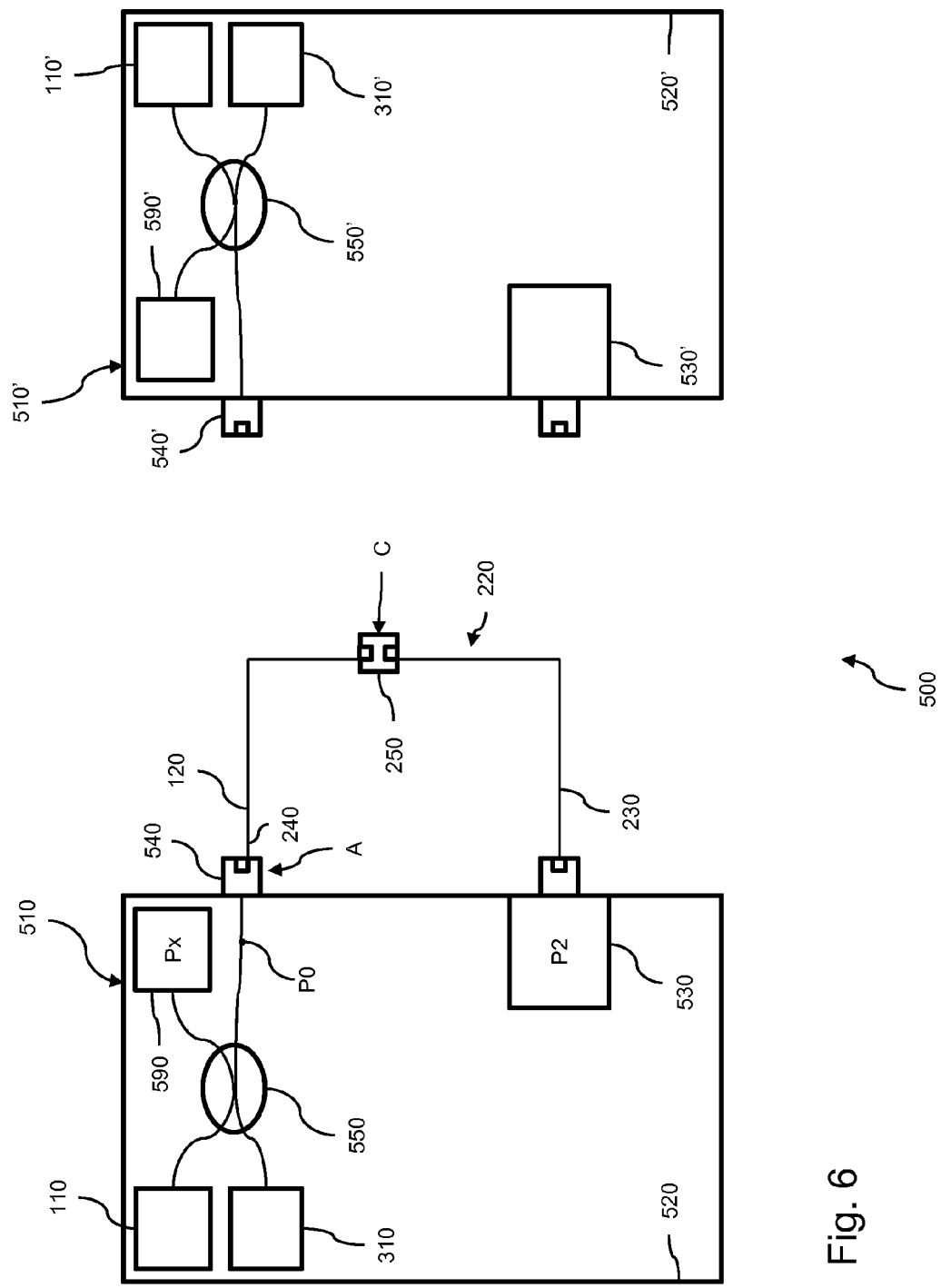
FIG. 6 is a schematic view of an example of an OPLM system, in accordance with a second step of the second method for referencing the OPLM system.

As shown in FIG. 6, while maintaining, as explained hereinabove, the first end 240 of the first reference optical waveguide 120 connected to the optical source 110 via the connector interface 540, a second step of the second method for referencing the OPLM system is performed. In this embodiment, this second step includes measuring, using the large-area detector 530, a second power value P2 of power transmitted into the reference waveguide link 220 including the first and second reference optical waveguides 120 and 230, as shown in FIG. 6. The second power value P2 is indicative of at least the connector loss C associated with the connector 250, which connects the first and second reference optical waveguides 120 and 230. As described above, the connector loss value C can be derived from the first and second power values P1, P2:

$$C=P1-P2. \qquad (5)=(1)$$

Again, optionally, the value of the connector loss C may be compared to a predetermined threshold for verification of the quality of the connection at the connector 250.

Figure 7:
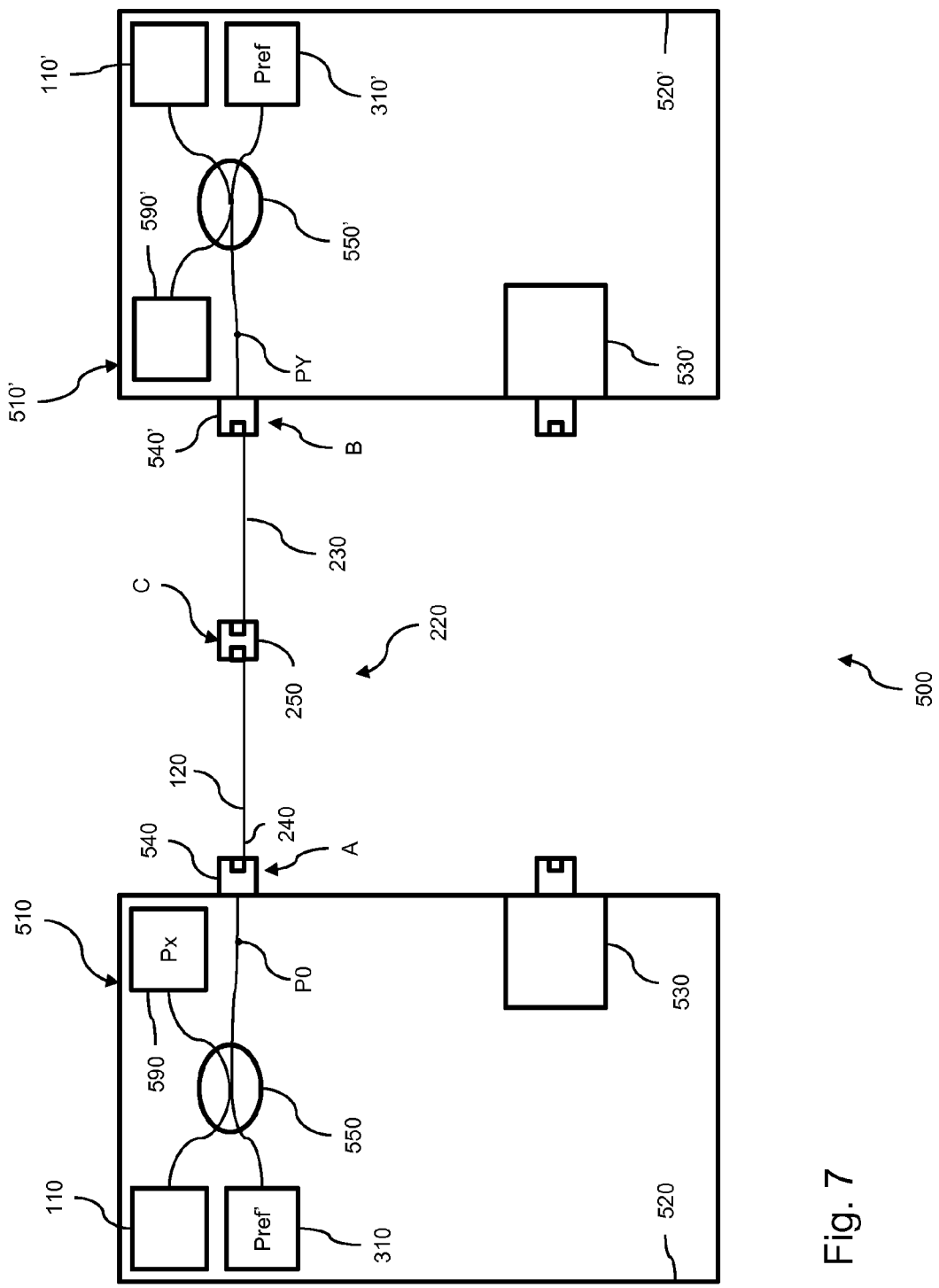
FIG. 7 is a schematic view of an example of an OPLM system, in accordance with a third step of the second method for referencing the OPLM system.

Referring to FIG. 7, while maintaining the first reference optical waveguide 120 connected to the second reference optical waveguide 230 via the connector 250, the reference waveguide link 220 is disconnected from the large-area detector 530 and connected to the pigtailed detector 310' of the second OPLM device 510' via the connector interface 540'. Then, a third step of the second method for referencing the OPLM system is performed. This third step comprises measurement of the reference power value Pref using the pigtailed detector 310' of the second OPLM device 510', as depicted in FIG. 7. As for the second power value P2, the reference power value Pref is indicative of at least the connector loss C associated with the connector 250. Optionally, at this third step, and assuming that a connection between the OPLM device 510 and the first reference optical waveguide 120 has not been altered between the second step and the third step of the second method for referencing the OPLM system, insertion loss B associated with the connector interface 540' can be estimated using the reference power value Pref measured at the pigtailed detector 310' and the second power value P2. This is made possible from a factory calibration of the optical coupler 550' from which the power level PY downstream of the connector interface 540' can be retrieved. The insertion loss B may then be estimated from a difference between the power level PY and the second power value P2. Again, the estimated insertion loss B can be compared to a predetermined threshold for verification of the quality of the connection at the connector interface 540'.

It is noted that although the reference power value Pref is measured using the second pigtailed detector 310' of the second OPLM device 510', it is also possible to measure a reference power value Pref' using the first pigtailed detector 310 of the first OPLM device 510 when light is propagated from the second optical source 110' of the second OPLM device 510'.

As mentioned above, the reference power value Pref is corrected using the previously measured connector loss value C in order to obtain the corrected reference power value Pref,c and consequently reduce the bias associated with the two-cord reference procedure:

$$\text{Pref,c}=\text{Pref}+C. \qquad (6)=(2)$$

If the reference power value Pref' is also measured, it can be corrected to obtain the corrected reference power value Pref,c' in a similar manner using the measured connector loss value C.

Figure 8:
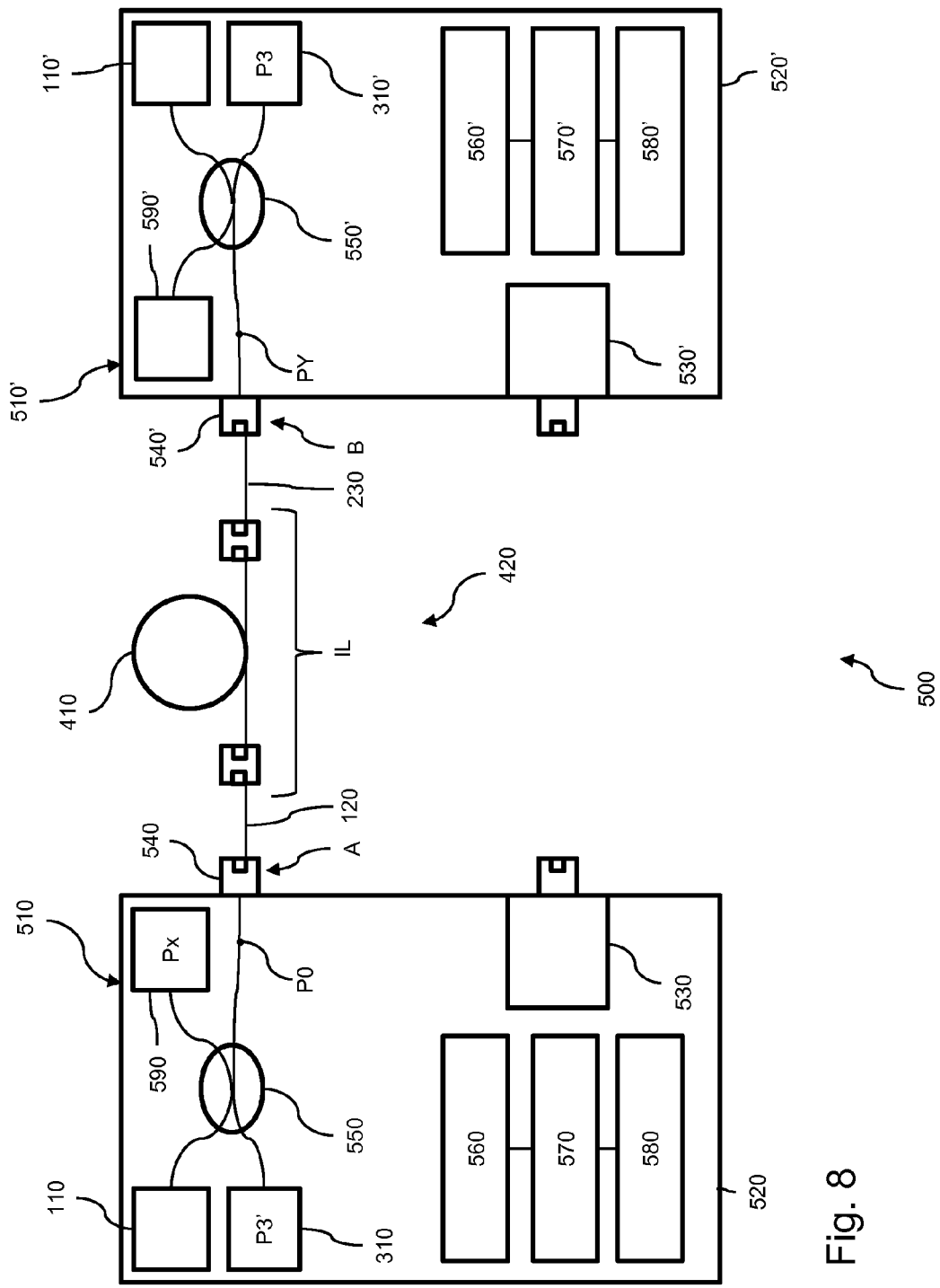
FIG. 8 is a schematic view of an example of an OPLM system, in accordance with a step of a second method for determining an insertion loss value of a DUT.

Referring to FIG. 8, a step of a second method for determining the insertion loss value IL is performed. This step includes measuring, using the pigtailed detector 310' of the second OPLM device 510', a third power value P3 of power transmitted into the test link 420 including the first reference optical waveguide 120 connected in series with the DUT 410, which is, in turn, connected in series with the second reference optical waveguide 230. In other words, the reference waveguide link 220 is opened at the connector 250 where each end of the DUT 410 is connected to the open ends of the first and second reference optical waveguides 120 and 230. It is understood that the first reference optical waveguide 120 should remain connected to the connector interface 540 of the first OPLM device 510 and that the second reference optical waveguide 230 should remain connected to the connector interface 540' of the second OPLM device 510'. The insertion loss value IL can be obtained by performing:

$$IL=P3-\text{Pref,c}=P3-(\text{Pref}+C)=P3-(\text{Pref}+(P1-P2)). \qquad (7)=(4)$$

As can be seen therefrom, the power of the optical source 110 does not need to be known and is considered constant over the measurements of P1 and P2. It is also considered constant over the measurements of Pref and P3, for instance. In this embodiment, the approximation is reliable since the fluctuations of such optical source 110 are small and give rise to an uncertainty that is normally much less than that inherent to other aspects of the measurement procedure. However, it is noted that if readings of the optical power monitors 590, 590' show that the power of either or both of the optical sources 110, 110' varies between the third step of the second method for referencing the OPLM system and the step of the second method for determining the insertion loss value IL, the measured power values can be corrected accordingly.

Moreover, the first and second OPLM devices 510, 510' have corresponding computer readable memories 560, 560', computing devices 570, 570' and communication modules 580, 580', which are in communication with one another via a signal connection for each one of the OPLM devices 510, 510'. The signal connection can be embodied in the form of a wired connection, a wireless connection or a combination thereof. The communication between the OPLM devices 510, 510' can be direct or indirect (e.g. via a network such as the Internet), In an embodiment, the respective communication modules 580, 580' of the two OPLM devices 510, 510' are in communication via the test link 420 connecting the first OPLM device 510 to the other device 510', using techniques known in the art. In another embodiment, the communication modules 580, 580' of the two OPLM devices 510, 510' communicate with one another using a separate communication link such as a wireless communication network.

It is understood that either or both of the memories 560, 560' may be employed to store any one of the power values P1, P2, and P3 and store the corrected reference power value Pref,c and the connector loss value C for each one of the wavelengths at which the measurements are taken. In an embodiment, the reference power value Pref is measured, in turn, along each of the two directions of the reference waveguide link 220, namely, Pref is measured using the second pigtailed detector 310' and Pref' is measured using the first pigtailed detector 310. In this case, each one of the memories 560, 560' can store corresponding corrected reference power values Pref,c, Pref,c' respectively obtained using the reference power values Pref, Pref' corrected using the same predetermined connector loss value C.

In an embodiment, the computer readable memory 560 has a program stored thereon which can guide an end user through each one of the above-described steps. In an embodiment, the end user is guided by subsequent sets of instructions displayed on a display (not shown) of the OPLM device 510.

In this specific embodiment, the computer readable memory 560 has recorded therein instruction code for execution by the computing device 570, 570' of either one of the OPLM devices 510, 510'. Such instruction code can include code for displaying the sets of instructions as well as code for determining the corrected reference power value Pref,c as well as code for determining the insertion loss value IL based on the previously measured values P1, P2, Pref and P3.

In another embodiment, the reference power value Pref and the third power value P3 are measured, in turn, in a bi-directional manner from the first and second OPLM devices 510, 510'. In this specific embodiment, two insertion loss values IL and IL' associated with corresponding directional measurements are obtained. In such an embodiment, it can be useful to average these two insertion loss values IL and IL'. In other words, the third power value P3 is measured at the pigtailed detector 310' of the second OPLM device 510' whereas a third power value P3' is measured at the pigtailed detector 310 of the first OPLM device 510, and respective insertion loss values IL, IL' are obtained using corresponding corrected reference power values Pref,c, Pref, c'. As understood by one skilled in the art, once the corrected reference power value Pref,c is obtained for a given OPLM system, a plurality of DUTs can be measured using the referenced OPLM system. As mentioned above, care should be taken not to disconnect the first reference optical waveguide 120 from the first OPLM device 510 and also not to disconnect the second reference optical waveguide 230 from the second OPLM device 510' once the OPLM system is referenced.

Figure 9:
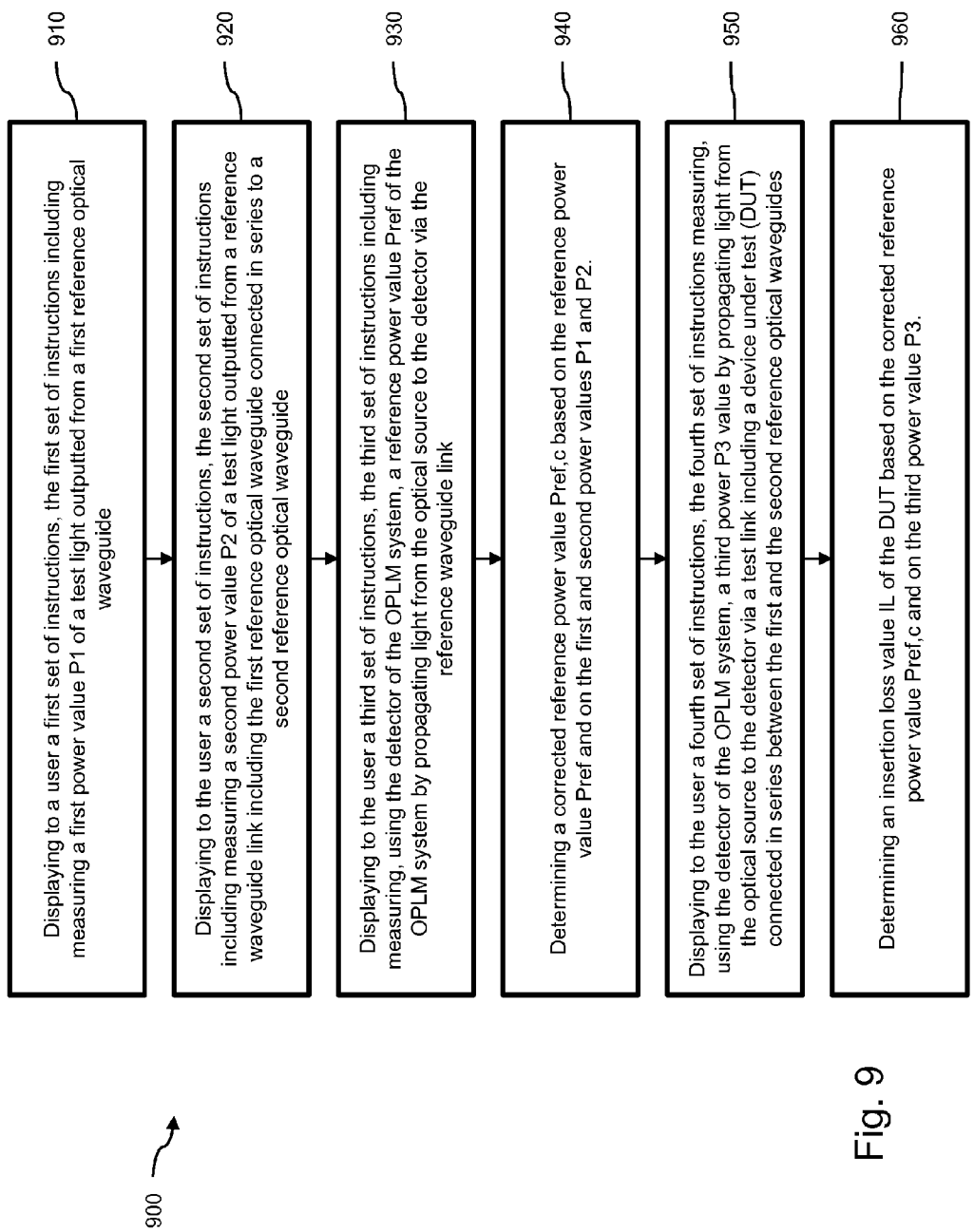
FIG. 9 is a flowchart showing steps to be performed by a program of an OPLM device, in accordance with an embodiment.

FIG. 9 is a flow chart showing an exemplary method 900 to be performed by the program stored in the computer readable memory 560. As depicted, the method 900 includes a step 910 which causes the display of the OPLM device to prompt a first set of instructions to a user, the first set of instructions including measuring, using large-area detection, a first power value P1 of a test light outputted from a first reference optical waveguide 120. The method 900 also includes a step 920 which causes the display of the OPLM device to prompt a second set of instructions to the user, the second set of instructions including measuring, using large-area detection, a second power value P2 of the test light outputted from a reference waveguide link 220. This reference waveguide link includes the first reference optical waveguide 120 which is connected in series to a second reference optical waveguide 230. The method 900 also includes a step 930 which causes the display of the OPLM device to prompt a third set of instructions to the user, the third set of instructions including measuring, using the pigtailed detector 310 of the OPLM system 500, a reference power value Pref of the OPLM system 500 by propagating light from the optical source 110 to the detector 310 via the reference waveguide link 220. Further, the method also comprises a step 940 which determines a corrected reference power value Pref,c based on the reference power value Pref and on the first and second power values P1 and P2. The method 900 also includes a step 950 which causes the display of the OPLM device to prompt a fourth set of instructions to the user, the fourth set of instructions measuring, using the detector 310 of the OPLM system 500, a third power P3 value by propagating light from the optical source 110 to the detector 310 via a test link 420 including a DUT 410 connected in series between the first and second reference optical waveguides 120 and 230. Then, the method 900 includes a step 960 that determines an insertion loss value IL of the DUT 410 based on the corrected reference power value Pref,c and on the third power value P3.

Figure 10A:
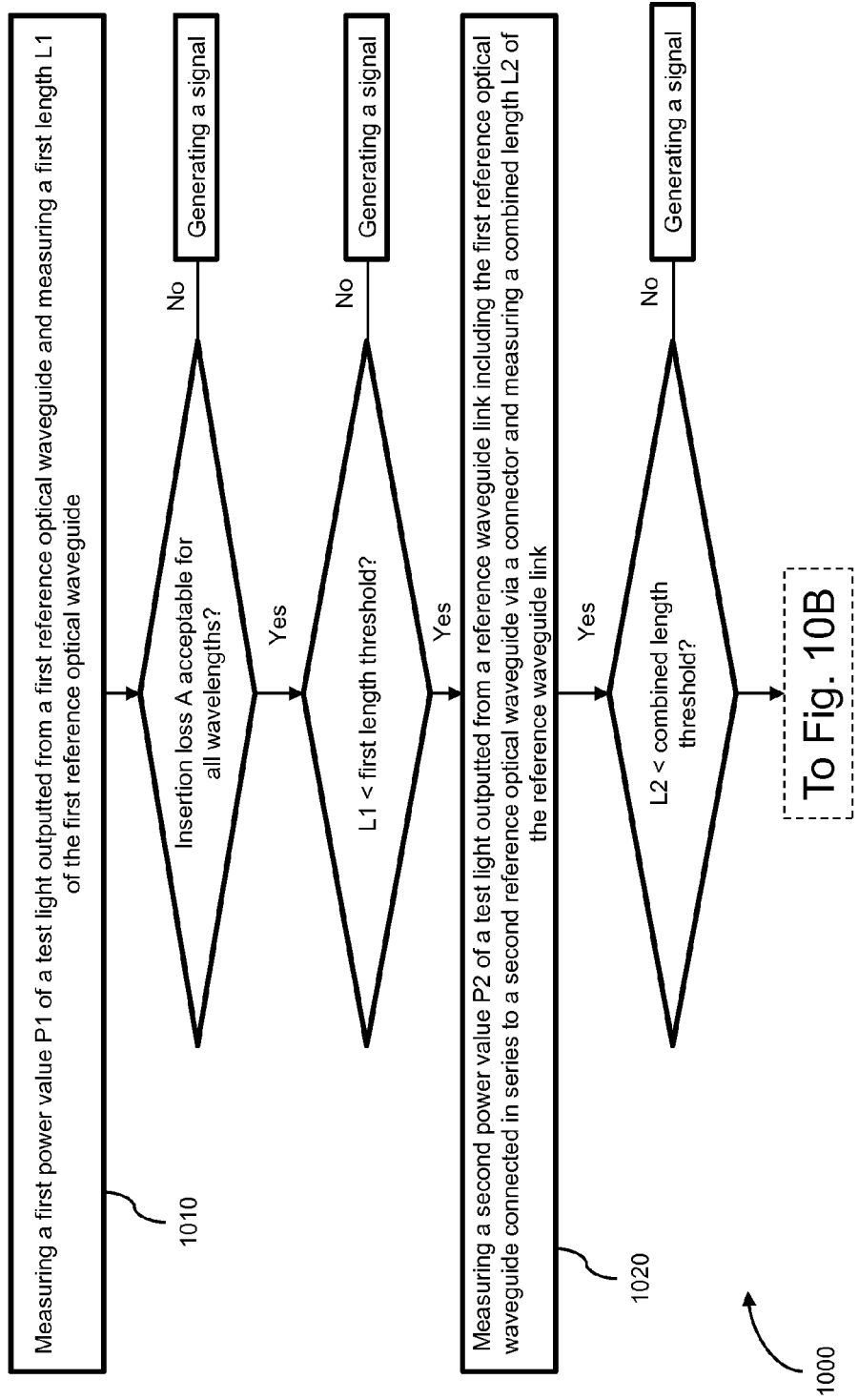
FIGS. 10A-10C show a flowchart illustrating a third method for referencing an OPLM system and a third method for determining an insertion loss value of a DUT.
Figure 10B:
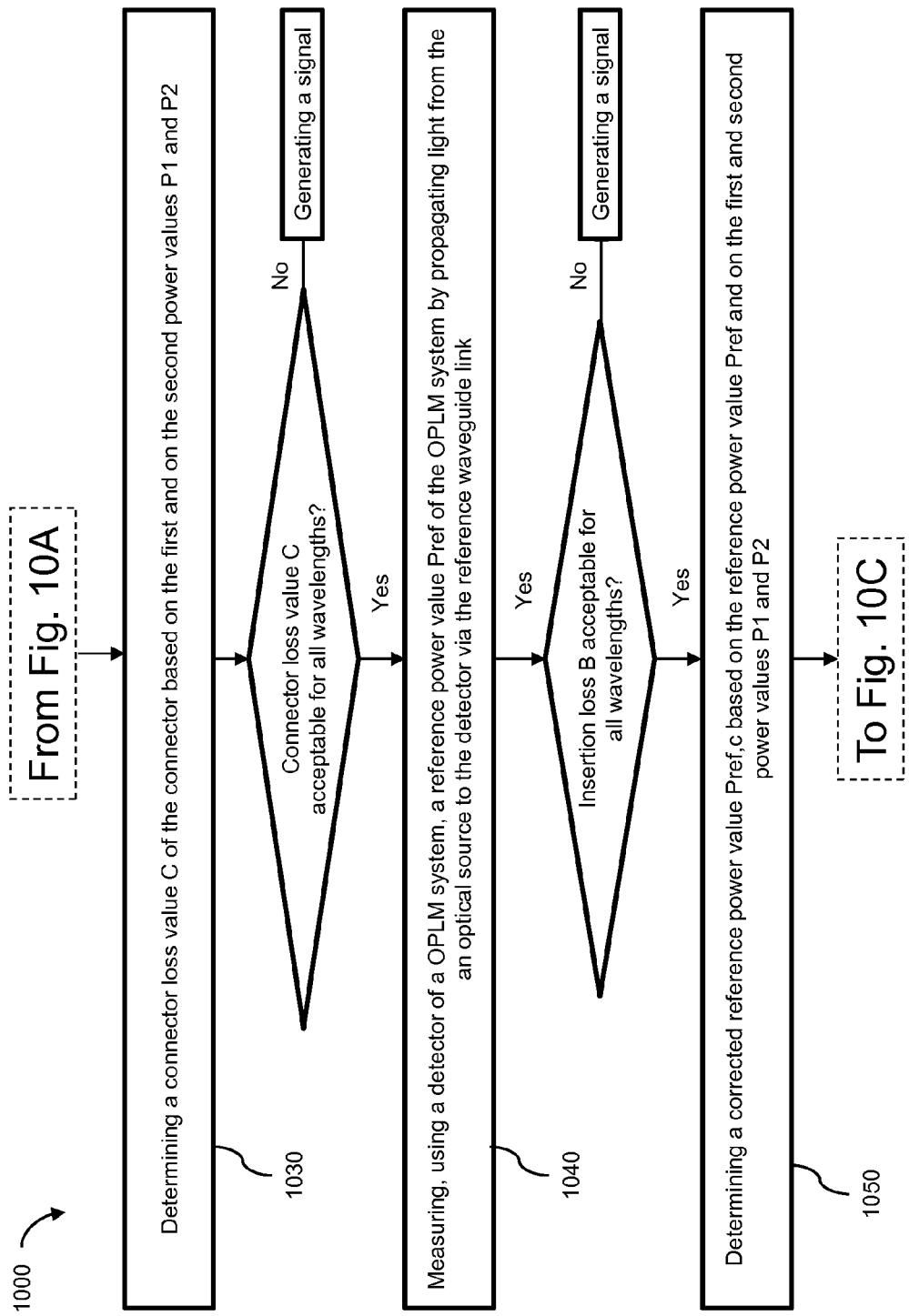
Figure 10C:
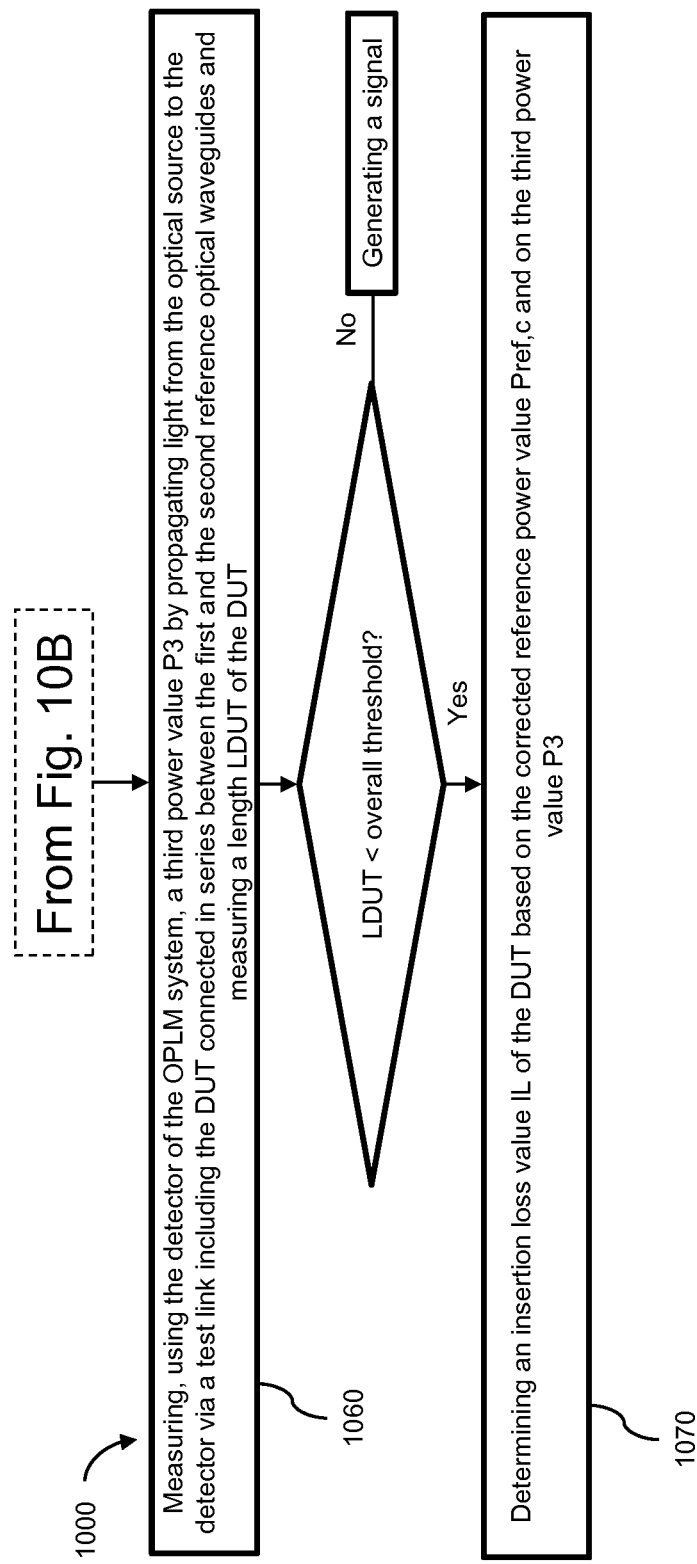

FIGS. 10A-10C show a flowchart 1000 illustrating a third method for referencing an OPLM system and a third method for determining an insertion loss value IL of a DUT. In an embodiment, these methods are embodied in the form of a computer program stored on a memory of an OPLM device. FIGS. 10A-10C are provided in three separate figures for ease of reading but should be read as a single continuous flowchart. The dashed boxes indicate the relationship between each one of the FIGS. 10A-10C. Broadly described, steps 1010-1070 of the flowchart 1000 are separated by checkpoints that compare values (e.g., losses and/or lengths of the segments of the test link 420) to corresponding thresholds. For instance, in the event that any of the insertion loss A, the connector loss C and the insertion loss B is higher than a respective threshold, the program is adapted to prompt the end user a warning message recommending that the connector 540, the connector 250 and/or the connector 540' be cleaned. The lengths L1 and L2 of the first and second reference optical waveguides 120 and 230 may also be validated upon comparison to corresponding length thresholds. Moreover, according to an embodiment where measured values P1, P2, Pref and P3 and losses A, B and C are measured for multiple wavelengths, the program operated by the OPLM system 500 validates vectors A, B and C to corresponding threshold vectors. For instance, if the insertion loss B is acceptable at some wavelengths and unacceptable at other wavelengths, the program is configured to generate a signal indicative of a failed reference.

The following describes the flowchart 1000 in detail. For ease of reference, the flowchart 1000 will be described in connection with the OPLM system 500 shown in FIGS. 5-8. Referring specifically to FIG. 10A, the flowchart 1000 has a step 1010 of measuring the first power value P1 of a test light outputted from the first reference optical waveguide 120 and resulting from the propagation of light from the optical source 110 to the detector 530 via the first reference optical waveguide 120 connected to the first OPLM device 510. Such measuring can be performed at one or at a plurality of wavelengths, depending of the embodiment. The step 1010 includes measuring a first length L1 of the first reference optical waveguide 120 using a phase-shift method as known in the art, for instance. As explained hereinabove, the insertion loss A can estimated from a difference between the first power value P1, the power value Px measured at the power source monitor 590 and a factory calibration. The flowchart 1000 then determines if the insertion loss A is acceptable for each one of the wavelengths at which the measurement has been performed. If the insertion loss A is deemed to be unacceptable following a comparison with a predetermined threshold, the program generates a warning message to be displayed to the end user. In this case, the warning message is indicative that the insertion loss A is unacceptable. If the insertion loss A is deemed acceptable, the flowchart 1000 determines if the first length L1 is below a first length threshold. If the first length L1 is deemed to be unacceptable following the comparison with the first length threshold, the program generates a warning message indicating that the first length L1 is too long. If the first length L1 is deemed to be acceptable, the flowchart 1000 performs a step 1020. This step 1020 includes measuring a second power value P2 of the test light outputted from a reference waveguide link 220 including the first reference optical waveguide 120 connected in series to a second reference optical waveguide 230. The step 1020 also includes measuring a combined length L2 of the reference waveguide link 220 using the phase-shift method, for instance. If the program determined that the combined length L2 is deemed to be unacceptable following a comparison of the combined length L2 and a combined length threshold, the program generates a warning message indicating that the combined length L2 is too long.

Referring now to FIG. 10B, the program goes on to step 1030 when the combined length L2 is determined to be acceptable. The step 1030 includes determining a connector loss value C of the connector 250 based on the first and second power values P1 and P2. Such measuring can be performed at one or at a plurality of wavelengths, depending of the embodiment. If following a comparison with a predetermined connector loss threshold, the program determines that the connector loss value C is unacceptable (based on a predetermined connector loss value threshold) for one of the wavelengths at which the measurement has been performed, the program generates a warning message accordingly. If the connector loss value C is deemed acceptable, the flowchart 1000 goes to step 1040. The step 1040 includes measuring the reference power value Pref of the OPLM system 500 by propagating light from the optical source 110 (or 110') to the detector 310' (or 310) via the reference waveguide link 220. At this stage, insertion loss B associated with the connector interface 540' can be estimated using the reference power value Pref measured at the pigtailed detector 310' and the second power value P2 when the connection between the OPLM device 510 and the first reference optical waveguide 120 has not been altered between the steps 1020 and 1030 of the flowchart 1000. The insertion loss B can be measured at one or at a plurality of wavelengths, depending of the embodiment. If following a comparison with a predetermined insertion loss threshold the insertion loss B is deemed to be unacceptable for one of the wavelengths at which the measurement has been performed, the program generates a warning message accordingly. If the insertion loss B is deemed acceptable, the flowchart 1000 proceeds with step 1050. The step 1050 includes determining the corrected reference power value Pref,c based on the reference power value Pref and on the first and second power values P1 and P2.

Referring now to FIG. 10C, the program continues to step 1060 which includes measuring a third power value P3 by propagating light from the optical source 110 (or 110') to the detector 310' (or 310) via the test link 420. As described above, the test link 420 includes the DUT connected in series between the first and second reference optical waveguides 120 and 230. The step 1060 further includes measuring a DUT length LDUT. For instance, the DUT length LDUT can be determined by measuring, using the phase-shift method, a test link length LTL associated with a length of the test link 420. In this embodiment, the DUT length LDUT is determined by subtracting the combined length L2 from the test link length LTL. If the DUT length LDUT is determined to be above a predetermined DUT length threshold, the program is configured to display a warning message to the end user. If the DUT length LDUT is determined to be acceptable, the flowchart 1000 can determine, at step 1070, the insertion loss value IL of the DUT based on the corrected reference power value Pref,c and on the third power value P3. Other criteria can be used to compare any one of the power values P1, P2, P3, Pref, Pref,c, the lengths L1, L2, LTL, LDUT, the insertion loss values A, B and IL to corresponding thresholds as deemed suitable for a given application. Such thresholds can be stored on a memory of either or both the first and second OPLM devices 510, 510'. As will be understood by the skilled reader, the flowchart 1000 has been described as an example. Other embodiments of the method for referencing the OPLM system and of the method for determining an insertion loss value of a DUT can be used.

As can be understood, the examples described above and illustrated are intended to be exemplary only. For instance, the pigtailed (and/or fibered) detector can be any type of non-large-area detector. The scope is indicated by the appended claims.

What is claimed is:

1. A non-transitory computer readable memory having recorded thereon instruction code for execution by a computing device for use with an optical power loss measurement (OPLM) system including an optical source and a detector, said instruction code comprising:
    code for displaying to a user a first set of instructions, the first set of instructions including measuring, using large-area detection, a first power value of all test light outputted from a first reference optical waveguide;
    code for displaying to the user a second set of instructions, the second set of instructions including measuring, using large-area detection, a second power value of all said test light outputted from a reference waveguide link including the first reference optical waveguide connected in series to a second reference optical waveguide;
    code for displaying to the user a third set of instructions, the third set of instructions including measuring, using the detector of the OPLM system, a reference power value of the OPLM system resulting from the propagation of light from the optical source to the detector via the reference waveguide link; and
    code for determining a corrected reference power value based on the reference power value and on the first and second power values.

2. The non-transitory computer readable memory of claim 1, wherein said instruction code further includes code for at least one of storing and communicating the corrected reference power value.

3. The non-transitory computer readable memory of claim 2, wherein the corrected reference power value include measurements at each one of a plurality of wavelengths, the optical power loss value being determined for each one of the plurality of wavelengths.

4. An optical power loss measurement (OPLM) system comprising:
    a first OPLM device including:
        a first housing having a first connector interface;
        a first optical source mounted in the first housing and optically coupled to the first connector interface; and
        a first large-area detector mounted to the first housing;
    a second OPLM device including:
        a second housing having a second connector interface;
        a first detector mounted in the second housing and optically coupled to the second connector interface; and
        a second large-area detector mounted to the second housing; and
    at least one computing device mounted in at least one of the first and second housings and in communication with the first optical source, the first and second large-area detectors and the first detector, the at least one computing device being configured to perform the steps of:
        receiving a first power value associated with measuring, using at least one of the first large-area detector and the second large-area detector, a test light outputted from a first reference optical waveguide;
        receiving a second power value associated with measuring, using at least one of the first large-area detector and the second large-area detector, the test light outputted from a reference waveguide link including the first reference optical waveguide connected in series to a second reference optical waveguide;

receiving a reference power value of the OPLM system, the reference power value being measured using the first detector of the second OPLM device and resulting from the propagation of light from the first optical source of the first OPLM device to the first detector of the second OPLM device via the reference waveguide link; and determining a corrected reference power value based on the reference power value and the first and second power values.

5. The OPLM system of claim 4, further comprising determining a reference loss value of the reference waveguide link by calculating the difference between the first power value and the second power value.

6. The OPLM system of claim 4, wherein said determining the corrected reference power value includes adding the reference loss value to the reference power value.

7. The OPLM system of claim 6, wherein the first detector of the second OPLM device is a fiber-pigtailed detector.

8. The OPLM system of claim 4, wherein the first power value and the second power values are measured using either the first large-area detector or the second large-area detector.

9. The OPLM system of claim 4, wherein the at least one computing device is further configured to perform the steps of:

receiving a third power value, the third power value being measured using the first detector of the second OPLM device and resulting from the propagation of light from the first optical source of the first OPLM device to the first detector of the second OPLM device via a test link, said test link including an optical device under test (DUT) connected in series between the first and second reference optical waveguides; and determining an insertion loss value of the DUT based on the corrected reference power value and the third power value.

10. The OPLM system of claim 9, wherein the said determining the insertion loss value includes calculating the difference between the third power value and the corrected reference power value.

11. The OPLM system of claim 9, wherein the first OPLM device further includes a second optical detector optically coupled to the first connector interface and the second OPLM device further includes a second optical source optically coupled to the second connector interface, the third power value being bi-directionally measured between the first OPLM device and the second OPLM device.

12. The OPLM system of claim 4, wherein the at least one computing device has the computer readable memory of claim 1.

13. The OPLM system of claim 4, wherein the first OPLM device further includes a second optical detector optically coupled to the first connector interface and the second OPLM device further includes a second optical source optically coupled to the second connector interface, the reference power value being bi-directionally measured between the first OPLM device and the second OPLM device.

14. The OPLM system of claim 4, wherein at least one of the first and second large-area detectors is mounted to one of the first and second OPLM devices.

15. A method for measuring an optical insertion loss of an optical device under test (DUT) using an optical power loss measurement (OPLM) system comprising an optical source and a detector, the method comprising the steps of:

obtaining a reference connection value from a difference between a second power value and a first power value, the first power value corresponding to a measurement of a test light at an open end of at least one first reference optical waveguide and the second power value corresponding to a measurement of the test light at an open end of a reference waveguide link including the first reference optical waveguide connected in series to a second reference optical waveguide, the first power value and the second power value being measured using large-area detection;

obtaining a reference power value of the OPLM system, the reference power value resulting from the propagation of light from the optical source to the detector via the reference waveguide link;

determining a corrected reference power value based on the reference power value and on the first and second power values;

obtaining, from the detector of the OPLM system, a third power value resulting from the propagation of light from the optical source to the detector via a test link including the DUT connected in series between the first and second reference optical waveguides; and determining the insertion loss of the DUT based on the corrected reference power value and on the third power value.

16. The method of claim 15, further comprising:

measuring said first power value of the test light at an open end of said at least one first reference optical waveguide;

measuring said second power value of the test light at an open end of said reference waveguide link;

measuring said reference power value resulting from the propagation of light from the optical source to the detector via the reference waveguide link; and measuring said third power value resulting from the propagation of light from the optical source to the detector via a test link.

17. The method of claim 16, wherein said test light is generated by said optical source during the step of measuring the first power value and the step of measuring the second power value.

18. The method of claim 17, wherein said measuring the first power value and said measuring the second power value are performed while maintaining unaltered optical continuity between the optical source and the first reference optical waveguide.

19. The method of claim 16, wherein said measuring the reference power value and said measuring the third power value are performed while the optical continuity between the second optical reference waveguide and the detector is maintained unaltered.

20. The method of claim 15, wherein said obtaining the reference connection value further comprises determining a reference loss value of the reference waveguide link by calculating the difference between the first power value and the second power value.

21. The method of claim 15, wherein said determining the corrected reference power value includes adding the reference loss value to the reference power value.

22. The method of claim 15, wherein said detector of the OPLM system is a fiber-pigtailed detector.

23. The method of claim 15, wherein said determining the insertion loss includes calculating the difference between the third power value and the corrected reference power value.

24. The method of claim 15, wherein the corrected reference power value and the third power value include measurements at each one of a plurality of wavelengths, the insertion loss being determined for each one of the plurality of wavelengths.

* * * * *